United States Patent [19]
Nevrekar

[11] Patent Number: 6,027,098
[45] Date of Patent: Feb. 22, 2000

[54] ROTARY VALVE

[76] Inventor: Venkatesh R. Nevrekar, 6 Castle Creek Pl., Shawnee, Okla. 74801

[21] Appl. No.: 08/276,986

[22] Filed: Jul. 20, 1994

Related U.S. Application Data

[63] Continuation-in-part of application No. 08/209,701, Mar. 10, 1994, Pat. No. 5,407,176.

[51] Int. Cl.[7] ..................................................... F16K 5/16
[52] U.S. Cl. .................................. 251/164; 74/424.8 VA
[58] Field of Search ................................... 251/161, 188, 251/312, 162, 163, 164, 330, 214; 74/424.8 VA, 22 R

[56] References Cited

U.S. PATENT DOCUMENTS

| | | | |
|---|---|---|---|
| 1,002,835 | 9/1911 | Gorton | 251/312 |
| 2,128,071 | 8/1938 | Bischoff | 251/164 X |
| 2,149,725 | 3/1939 | Cavariis | 251/56 X |
| 2,392,880 | 1/1946 | Reed | 74/22 |
| 2,539,106 | 1/1951 | Schenck | 251/312 |
| 3,379,405 | 4/1968 | Natho | 251/330 X |
| 3,390,861 | 7/1968 | Masheder | 251/163 X |
| 3,515,371 | 6/1970 | King et al. | 251/214 |
| 3,625,478 | 12/1971 | Killian | 251/163 |
| 3,780,986 | 12/1973 | Fujiwara | 251/164 X |
| 4,930,748 | 6/1990 | Gonsion | 251/312 X |
| 5,407,176 | 4/1995 | Nevrekar | 251/214 |

OTHER PUBLICATIONS

"How FMC's Model ULT Plug Valve meets your requirements"—a 2–page article from the FMC company's brochure of Summer 1994.

*Primary Examiner*—John Fox

[57] ABSTRACT

A rotary valve assembly comprising a valve body having a fluid flow passageway in communication with the valve body cavity which comprises a rotatable closure member for selectively closing or opening the fluid flow passageway intersecting the valve body cavity. A valve operator consists of a reciprocatable and rotatable stem connected to the closure member so that the stem can reciprocate relative to the closure member and when the stem rotates, the closure member and the stem rotate together. The closure member comprises stop means to arrest movement of the stem towards the closure member in order to transmit the stem force to the closure member. A lift-and-turn mechanism or a lift-turn-and-reseat mechanism actuates the stem. In one embodiment, the stem back-seats to prevent fugitive emissions. The valve operator selectively moves the closure member to a flow closed position or to a flow open position.

15 Claims, 1 Drawing Sheet

FIG. 1-A

ROTARY VALVE

RELATED APPLICATIONS

This application is a continuation-in-part of U.S. patent application Ser. No. 08/209,701 filed on Mar. 10, 1994, entitled "BACK-SEATING OF ROTARY VALVE STEM ", Now U.S. Pat. No. 5,407,176, the details of which are incorporated herein by reference.

BACKGROUND OF THE INVENTION

1. Field of the Invention

The present invention relates to rotary valves in which the stem reciprocates relative to the closure member and in which the stem is connected to the closure member so that when the stem rotates, the closure member and the stem rotate together. The improvement consists of a rotary valve with negligible dead cavity space in the valve body and a valve that automatically self-adjusts for wear of the sealing surfaces and maintains sealing integrity independent of fluid pressure. In one embodiment,the stem back-seats to reduce fugitive emissions.

2. Brief Description of Prior Art

In a rotary valve the closure member is rotated between the valve closed position and the valve open position. The rotation of the closure member is done with the help of a stem connected to the closure member. In a ball valve, the stem only rotates and does not reciprocate. In a rotary tapered plug valve, e.g. a sleeve-lined plug valve, the stem also rotates and does not reciprocate. In a tapered plug valve where the plug lifts, rotates and then reseats onto the valve body seats, the stem,which is integrally connected to the plug, rotates as well as reciprocates with the plug.

A valve assembly has a valve body having a body cavity. Due to the nature of the assembly to achieve sealing integrity, there remains some dead cavity space in the valve body of a ball valve. In a tapered plug valve in which the plug lifts, rotates, and then reseats onto the valve body seats, there also remains some dead cavity space to allow for the lifting of the plug. However, when the plug is lowered onto the valve body seats, suspended particles in the fluid medium get trapped between the plug and the seating surfaces, thereby compromising sealing integrity. So a lifting plug type of valve can be used only for clean fluids without suspended particles in fluid. In many of the valves that are in use today, the sealing integrity is compromised when the sealing surfaces wear out with valve usage and the valve starts to leak. The dead cavity space in a valve body contributes to the accumulation of debris in the body cavity. This is particularly disadvantageous for sanitary applications of the valve. These are some of the disadvantages of the valves currently in use today.

Therefore there exists a need today for a valve with negligible dead cavity spacein the valve body, and for a valve that automatically self-adjusts for wear of the sealing surfaces and maintains sealing integrity independent of fluid pressure. There also exists a need today for a valve that can be used with clean fluids as well as with fluids with suspended particles, e.g. slurry.

In valves that are in use today, only non-rotary valves with reciprocating stems are provided with back-seats that can be loaded with externally variable stem seating force. So far it has been found very difficult and elusive to provide back-seats on rotary valve stems to prevent fugitive emissions. The current method of containing fugitive emissions in rotary valves is to put the stem packing under "live loading" with springs which provides a constant compressive force on the stem packing. This compressive force is not automatically self-adjusting.

Therefore, there exists a need today in which rotary valves could be provided with back-seats for the stem whereby the back-seating force automatically self-adjusts for wear of the seating surfaces independent of fluid pressure, in order to prevent fugitive emissions and not just to contain them as is the case with live loading of stem packing.

BRIEF DESCRIPTION OF THE PRESENT INVENTION

This invention is concerned with minimizing the dead cavity space in rotary valves, and achieving sealing integrity with automatic self-adjustment for wear of the sealing surfaces. The present invention also teaches valves than can be used for handling clean fluids as well as fluids with suspended particles.

A rotary valve comprises a valve body having a valve body cavity and a fluid flow passageway therethrough intersecting the body cavity. A flow control member is disposed in the body cavity for selectively closing or opening the fluid flow passageway. The flow control member has a solid portion to close the fluid flow passageway. A valve operator is connected to the flow control member for selectively moving the flow control member to a flow closed position or to a flow open position. The valve operator consists of a movable stem connected to the flow control member so that when the stem rotates, the flow control member and the stem rotate together. The flow control member further has means to permit the stem to reciprocate relative to the flow control member. The flow control member also has stop means to arrest the further movement of the stem towards the flow control member so that the stem force is transmitted to the flow control member.

The valve operator comprises a lift-and-turn means whereby when the valve operator is moved in one direction, the stem rotates together with the flow control member through a pre-determined interval of stem rotation, and with further movement of the valve operator in the same direction, the stem moves towards the flow control member until the stop means arrests further movement of the stem towards the flow control member thereby transmitting the stem force to the flow control member to sealingly close the fluid flow passageway. When the valve operator is moved in the opposite direction, the stem moves away from the flow control member to relieve the stem force off the flow control member and with further movement of the valve operator in the same direction, the stem rotates together with the flow control member through a pre-determined interval of stem rotation to open the fluid flow passageway.

In another embodiment of the present invention, the stem has a back-seat to sealingly engage the stem seating surface surrounding the stem passageway in fluid communication with the valve body cavity and through which the stem passes. And with further movement of the valve operator in the same direction to open the valve, the stem back-seat sealingly engages the stem seating surface to seal the stem passageway from the valve body cavity, and thereby prevents fugitive emissions.

In another embodiment of the present invention, the closure member has a hollow conduit portion therethrough alignable with the fluid flow passageway. The valve operator comprises a lift-turn-and-reseat mechanism whereby the stem is lifted, rotated and then lowered. With this mechanism, when the valve operator is moved in one direction to move the flow control member, the stem moves a limited extent away from the flow control member in order to relieve the stem force off the flow control member. The stem and the flow control member then rotate together through a pre-determined interval of stem rotation. With further movement of the valve operator in the same direction, the stem moves in the opposite direction towards the flow control member until the stop means arrests further movement of the stem towards the flow control member thereby transmitting the stem force to the flow control member in order to close the fluid flow passageway. When the fluid flow passageway is to be opened, the valve operator is moved in the opposite direction and the above sequence of stem movement is repeated. That is, the stem moves away from the flow control member in order to relieve the stem force off the flow control member, the stem then rotates together with the flow control member through a pre-determined interval of stem rotation to open the fluid flow passageway. With further movement of the valve operator in the same direction, the stem moves in the opposite direction towards the flow control member thereby transmitting the stem force to the flow control member to reseat the flow control member on the valve body seats in the valve open position.

When a lift-and-turn mechanism is used, the fluid flow passageway is sealed from the valve body cavity when the valve is in fluid flow closed position. But with a lift-turn-and-reseat mechanism, the fluid flow passageway can be sealed from the valve body cavity in fluid flow closed position of the valve as well as in fluid flow open position of the valve, when so desired.

In the present invention, the stem is not integrally connected with the flow control member. The stem is only "slidingly" connected with the flow control member so that the stem can reciprocate relative to the flow control member. Thus the flow control member does not reciprocate with the stem when the stem moves away from the flow control member. Therefore, the bonnet can be placed very close to the top of the flow control member in the valve assembly, thereby minimizing the dead cavity space in the valve body. The flow control member can be provided with a trunnion at the bottom, if it is desired to obtain sealing of the fluid flow passageway independent of fluid pressure. However, without the trunnion, sealing function is aided by the fluid pressure acting on the flow control means in the fluid flow closed position.

Secondly, when the stem moves towards the flow control member, the stop means in the flow control member arrests further stem movement towards the flow control member so that the stem force is transmitted to the flow control member to achieve sealing integrity.

Thirdly, when the stem moves away from the flow control member, the stem force is relieved off the flow control member, thereby permitting lower stem torque to rotate the flow control member, and since the flow control member does not move with the stem, the dead cavity space in the valve body is minimized.

Fourthly, the valve operator automatically self-adjusts the stem force to maintain sealing integrity of the valve when the sealing surfaces wear out with valve usage. This is made possible because the reciprocating stem transmits the stem force to the flow control member when the stem reciprocates towards the flow control member. In other words, in the present invention, the fluid flow passageway is sealed and unsealed by the reciprocating movement of the stem caused by the valve operator, and sealing does not depend on fluid pressure. However, fluid pressure in the fluid flow passageway can aid the sealing function. The valve operator reciprocates the stem and as the sealing surfaces wear out, the valve operator provides the automatically externally variable stem force needed to maintain effective sealing of the fluid flow passageway.

The connecting means between the stem and the flow control member comprises a one-way clutch system in order to transmit force from the stem to the flow control member. When the stem moves in one direction towards the flow control member, the stem force is transmitted to the flow control member and when the stem moves in the opposite direction away from the flow control member, the stem force is relieved off the flow control member.

The instant invention is a very simple concept. This concept teaches that when a rotary valve stem is permitted to reciprocate relative to the flow control member, the flow control member does not have to reciprocate and the valve operator provides the necessary automatically externally variable stem force required to achieve sealing integrity.

Until now, a lift-and-turn mechanism is used for lifting the flow control member off the valve body seats. However, the present invention is a NEW USE concept for the lift-and-turn mechanism and again a novel concept at that.

Thus the present invention teaches a new valve in which the flow control member does not reciprocate and hence does not lift clear off the valve body seats, thereby permitting the use of the valve for handling clean fluids as well as non-clean fluids having suspended particles, e.g. slurry. The present invention also teaches a valve that automatically self-adjusts for wear of the sealing surfaces in order to maintain sealing integrity.

An object of the present invention is to provide for a valve which comprises negligible dead cavity space in the valve body cavity.

Another object of the present invention is to provide for a valve which automatically self-adjusts for wear of the sealing surfaces to maintain sealing integrity, and a valve in which the stem back-seats to prevent fugitive emissions.

A further object of the present invention is to provide for a valve with lower turning torque.

Another object of the present invention is to provide for a valve that can be used for handling clean fluids as well as fluids with suspended particles.

Other objects and advantages of the invention will become apparent as the following detailed description is read in conjunction with the accompanying drawings and the appended claims.

BRIEF DESCRIPTION OF THE DRAWINGS

FIG. 1-A is a fragmentary side view of FIG. 1 looking in the direction denoted by the arrow "A".

DETAILED DESCRIPTION

Figure 1:
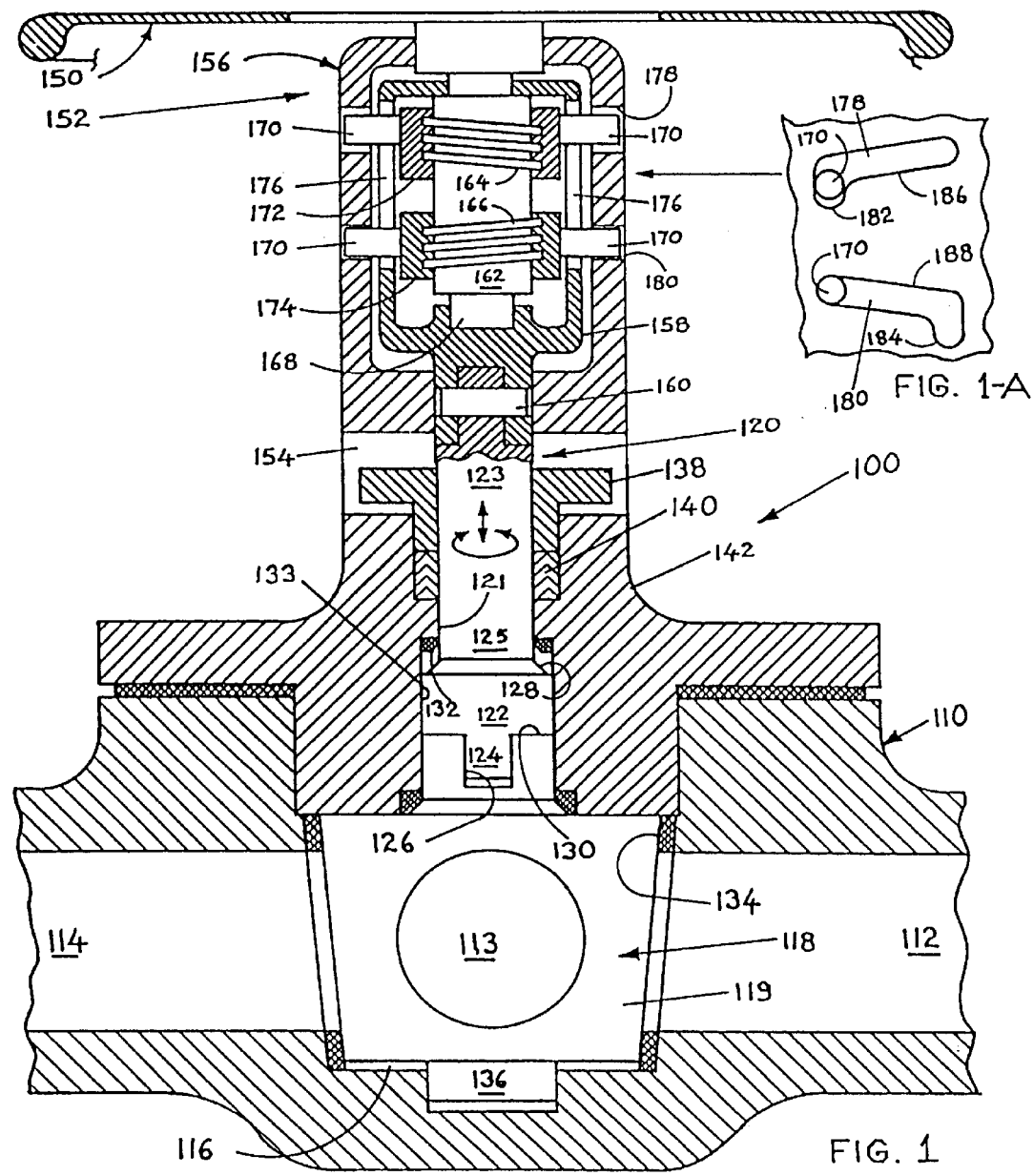
FIG. 1 is a side elevational, cross-sectioned view of a rotary plug valve constructed in accordance with the present invention.

With reference to FIG. 1, a rotary tapered plug valve assembly 100 is shown as constructed in accordance with features of the present invention.

A valve body 110 includes fluid flow passageways 112 and 114 on opposite sides of the valve body cavity 116. The valve body cavity 116 is open to the fluid flow passageways 112 and 114, and also opens to one side of the valve body 110 to communicate upwardly with the bonnet 142.

A flow control member comprising a tapered plug 119 is disposed in the cavity 116 to open or close the fluid flow passageways 112–114. The plug closure member 119 is a part of the flow control member assembly 118 and has a fluid flow conduit 113 therethrough alignable with the fluid flow passageways 112–114. The valve body 110 is lined with an elastomeric sleeve 134 with openings for fluid flow surrounding the fluid flow passageways 112,114 to sealingly engage the plug closure member 119.

The plug closure member 119 is rotated by a valve operator 150 which comprises a stem 120 that passes through the stem passageway 121 in the bonnet 142. The stem passageway 121 communicates with the body cavity 116 and has a stem seating ring 132 disposed in the recess 133 surrounding the stem passageway 121. The upper end 123 of the stem 120 is connected to the valve operator 150 through a lift-turn-and-reseat mechanism 152 by which the stem 120 is reciprocated and rotated. The lower end 125 of the stem 120 passes through the stem passageway 121 and has an enlarged portion with a collar 122 which has a narrow tongue 124 at the bottom. The tongue 124 protrudes into an elongated groove 126 in the plug closure member 119. The depth of the groove 126 is greater than the depth of the tongue 124 so that the tongue 124 does not touch the bottom of the groove 126 and thus can reciprocate in the groove 126 to a limited extent. The width of the groove 126 is such that the tongue 124 is "slidingly" connected to the plug 119 so that when the stem 120 rotates, the plug closure member 119 rotates with the stem. The stem collar 122 has a stem sealing surface 128, also called stem back-seat, to seal against the stem seating surface 132 surrounding the stem passageway 121.

The collar 122 can back-seat against the stem seating ring 132 in the bonnet 142 in order to prevent fugitive emissions arising out of hazardous fluids in the valve body cavity 116. A packing gland 138 exerts compressive force on the stem packing 140 surrounding the stem 120 to effect sealing engagement therewith.

The plug valve assembly 100 is shown in the closed position in FIG. 1. When the valve operator 150 moves in one direction to open the valve, the stem 120 moves up a limited extent away from the plug closure member 119. This upwardly reciprocating movement of the stem 120 is accommodated by the tongue 124 sliding in the groove 126 in the plug 119. The top surface 130 of the plug 119 acts as a stop means on the plug 119 to arrest further downwardly reciprocating movement of the stem 120 towards the plug closure member, thereby transmitting the stem force to the plug 119. The upward movement of the stem 120 relieves the stem force off the plug closure member 119 and thus facilitates stem rotation with less effort by the valve actuator 150. With further movement of the valve operator 150 in the same direction to open the valve, the stem 120 rotates together with the plug closure member 119 through a pre-determined interval of stem rotation, in this case 90 degrees, to open the fluid flow passageways 112–114 by aligning the conduit 113 with the fluid flow passageways 112–114. With continued further movement of the valve operator 150 in the same direction to open the valve, the stem 120 moves in the opposite direction towards the plug closure member until the stem collar 122 engages the plug stop means 130 thereby transmitting the stem force to the plug closure member 119 to provide additional thrust to the plug to achieve higher sealing integrity than the original sealing capability in the "as assembled" condition of the valve. Due to this additional thrust onto the plug by the stem 120, the plug sealingly engages the sleeve 134 thereby sealing the fluid flow passageways 112–114 from the valve body cavity 116 in the fluid flow open position of the valve. This sequence of stem movement of unseating, turning and reseating the stem is obtained by the lift-turn-and-reseat mechanism 152 referred to earlier.

When the valve operator is moved in the opposite direction to close the valve, the said sequence of stem movement described hereinabove is repeated. That is, the stem 120 moves upwards away from the plug to relieve the stem force off the plug 119 to facilitate stem rotation, the stem 120 then rotates through 90 degrees together with the plug closure member 119 and with further movement of the valve operator 150 in the same direction to close the valve, the stem 120 moves down towards the plug 119 until the collar 122 engages the stop means 130 on the plug 119 thereby transmitting the stem force onto the plug 119 to sealingly close the fluid flow passageways 112–114 in the valve closed position. The plug 119 carries a trunnion 136 at the bottom by which the sealing function is made independent of fluid pressure. However, sealing function is aided by fluid pressure.

Thus, the fluid flow passageway 112–114 is sealed from the valve body cavity 116 when the valve is in the fluid flow closed position as well as in the fluid flow open position of the valve. This sealing is achieved by using the lift-turn-and-reseat mechanism 152 for the stem movement during the opening and closing movement of the valve operator 150. As the sleeve 134 wears out due to valve usage, the valve operator 150 automatically provides the externally variable stem force needed to maintain sealing integrity through the lift-turn-and-reseat mechanism 152.

Any generic lift-turn-and-reseat mechanism can be used by which the stem is unseated from the plug, rotated and then reseated onto the plug. In FIG. 1-A, the lift-turn-reseat mechanism 152 that is shown, is constructed similar to the one disclosed in U.S. Pat. No. 2,392,880 Jan. 15, 1946 by I. N. Reed which is designed for unseating and reseating a tapered plug onto the valve body seats. However, the principle of operation is the same that can be applied to the present invention.

Referring to FIG. 1 and FIG. 1-A, the bonnet extends into a yoke 154 to house the packing gland 138. The yoke 154 supports a housing 156 inside which is disposed the lift-turn-and-reseat mechanism 152 which consists of a cage 158 that is connected to the upper end 123 of the stem 120 by means of a cross-pin 160. An operative screw 162 with opposing external threads 164 (left hand) and 166 (right hand), is journaled at 168 in the cage 158. The threads 164, 166 co-act with complementary internally threaded collars 172, 174 respectively. The collars 172, 174 have diametrically opposed pins 170 which protrude through the elongated slots 176 opposite each other and formed in the walls of the cage 158. The slots 176 are parallel to the operating screw axis 162. The pins 170 are screwed into the collars 172, 174 for facilitating assembly.

The ends of the pins 170 are guided in spirally disposed grooves 178, 180 formed in the housing 156. FIG. 1-A shows the disposition of the grooves 178, 180 when looked in the direction of arrow "A" towards the housing 156. The grooves 178, 180 have small vertical portions 182, 184 parallel to slots 176, and inclined portions 186, 188 respectively. In FIG. 1-A, the position of the pins 170 is shown in the valve closed position when the collar 122 engages the stop means 130 on the plug 119.

When the valve operator 150 is turned in one direction to open the valve—in this case anticlockwise looking from the top, the operating screw 162 rotates anticlockwise. The lower pin 170 being at the end of the groove 180, cannot move up. Therefore, the operating screw 164 pushes the collar 172 up along the vertical portion 182 of the groove 178, and this in turn pushes the whole stem 120 up so that the stem collar 122 moves away from the stop means 130. With further movement of the valve operator in the same direction, the pins 170 are forced to travel along the inclined portions 186, 188 of the grooves 178, 180 respectively, until the pins 170 reach the end of the inclined portions of the grooves 178, 180. The guided movement of the pins 170 along the inclined portions of the grooves 178, 180, forces the cage 158 to rotate through a like angle, which again causes the stem 120 and the plug 119 to rotate together through a like angle, in this case 90 degrees.

With continued further rotation of the valve operator 150 in the same direction, the upper pin 170 cannot travel further. The operating screw thread 166 therefore pushes the lower collar 174 downwards along the vertical portion 184 of the groove 180. This in turn pushes the stem 120 downwards until the stem collar 122 engages the stop means 130 on the plug 119 and the stem force is transmitted to the plug 119 to result in additional thrust on the plug which then sealingly engages the sleeve 134, thereby sealing the fluid flow passageways 112–114 from the valve body cavity 116 in the fluid flow open position of the valve assembly 100.

When the valve operator 150 is moved in the opposite direction, in this case clockwise looking from top, in order to close the valve, the sequence of stem movement is repeated—namely, the stem collar 122 lifts off the stop means 130, rotates through 90 degrees and then reseats onto the top of the plug at the stop means 130 to transmit the stem force to the plug closure member 119.

The two grooves 178 and 180 together with their respective threaded collars 172, 174 represent a "lift-turn-and-reseat" mechanism by which the stem is unseated, rotated and then reseated when the valve operator 150 is moved in one direction and the sequence is repeated when the valve operator 150 is moved in the opposite direction. However, each of the grooves 178 and 180 individually represents a "lift-and-turn" mechanism by which the stem is unseated and rotated when the valve operator is moved in one direction, and when the valve operator is moved in the opposite direction, the sequence of stem movement is reversed. The grooves can be constructed with different combinations of vertical, inclined and horizontal portions to obtain a particular desired sequence of stem movement, and this will be apparent to anyone skilled in the art. For example, when it is desired to seal the stem passageway 121 from the valve body cavity 116, the valve operator 150 is moved in the same direction beyond the rotation of the flow control member 118 to open the valve. The stem collar 122 back-seats against the stem seating surface of the stem seating ring 132 in order to seal the stem passageway 121 from the valve body cavity 116. For this sequence of stem movement, an individual groove 178 or 180 can be used with an additional vertical portion of the groove at the other end. Such a construction is shown in greater details in the applicant's patent application Ser. No. 08/209,701 filed on Mar. 10, 1994, of which this patent application is a continuation-in-part. Put another way, when the stem 120 reciprocates towards the flow control member 118, the stem 120 transmits the stem force to the flow control member 118, and when the stem reciprocates away from the flow control member, the stem back-seats to seal the stem passageway from the valve body cavity. That is, the stem sealing surface 128 sealingly engages the stem seating surface 132 surrounding the stem passageway 121 thereby sealing the stem passageway 121 from the valve body cavity 116.

In FIG. 1, 1-A, the Lift-Turn-and-Reseat means are as shown in Reed 2,390,880. However, there are many generic Lift-and-Turn means are available, and there are many variations of Lift-and-Turn means that can be used for the instant invention. Nevrekar 5,205,535 shows a lift-and-turn mechanism that is spring activated and can also be used on the instant invention, although it may not be obvious to those skilled in the art. The flow control member 119 shown in FIG. 1 is a tapered plug. However, it should be clearly understood here that the flow control member can be any other kinds of closure members which can benefit from additional thrust from the valve operator means in obtaining higher sealing integrity independent of fluid pressure, e.g. a segmented tapered plug valve, or a tapered ball valve, or a segmented cylindrical plug valve, or a single segment tapered plug valve, etc. Secondly, the valve body in FIG. 1 is shown lined with an elastomeric sleeve 134. However, valve body seat rings or simply sealing rings can also be used; so also different combinations of sealing surfaces can be used.

It should be clearly understood here that a stop means like 130 in FIG. 1 on the flow control means is used to arrest axial motion of the stem which moves towards the flow control means, only to induce an axial stem force in the stem. However, by modifying the structure of the flow control means, it is possible to use a stop means to arrest axial motion of the stem which moves away from the flow control means. Thus, a stop means can be used on the flow control means to induce an axial stem force in either direction of stem movement, towards or away from the flow control means. The induced stem force then can be transmitted to the flow control means to obtain a better sealing function than when an axial force by the stem has not been applied to the flow control means.

From the above description it is clear that the present invention is well adapted to carry out the objects and to attain the ends and advantages mentioned herein as well as those inherent in the invention. While presently preferred embodiment has been described for purposes of this disclosure, it will be understood that numerous changes may be made which will readily suggest themselves to those skilled in the art and which are accomplished within the spirit of the invention disclosed and as defined in the appended claims.

What is claimed:

1. A valve comprising:
    a valve body having a body cavity with a fluid flow passageway therethrough defining a fluid flow-path intersecting the body cavity;
    a flow control means movably disposed in the body cavity for selectively closing and opening the fluid flow passageway;
    a valve operator means connected to the flow control means and comprising:
        a single valve operator;
        a stem mounted for movement in reciprocal directions relative to, and independent of, the flow control means, said stem having a stem axis;
        a stem moving means associated with the single valve operator and the stem, said stem moving means for moving the stem in reciprocal directions with respect to the flow control means to cause the stem to move in a sequence of steps that provides axial motion away from the flow control means and then rotary motion in response to movement of the single valve operator in one direction, and rotary motion and then axial motion towards the flow control means in response to movement of the single valve operator in another direction; and stop means disposed on the flow control means for arresting axial movement of the stem towards the flow control means and thereby transmitting a stem force to the flow control means, such that movement of the single valve operator in said one direction causes the flow control means to be substantially unloaded of axial force from the stem and then the stem rotated, and movement of the single valve operator in said another direction causes the stem to be rotated and then the flow control means loaded with an axial force by the stem so as to provide a better sealing function in a selected valve position than when an axial force by the stem has not been applied to the flow control means.

2. The valve as defined in claim 1, wherein said stem moving means causes the stem to move in a sequence of steps that provides only axial motion away from the flow control means, then rotary motion and then only axial motion towards the flow control means in response to movement of the valve operator in said one direction.

3. The valve as defined in claim 1, wherein said stem moving means causes the stem to move in a sequence of steps that provides only axial motion away from the flow control means, then rotary motion and then only axial motion towards the flow control means in response to movement of the valve operator in said another direction.

4. The valve as defined in claim 1, wherein the flow control means further comprises a trunnion on the valve body rotatable about the stem axis and disposed on a side of the flow control means opposite the stem.

5. The valve as defined in claim 1, wherein the flow control means further comprises a hollow conduit therethrough alignable with the fluid flow passageway.

6. The valve as defined in claim 1, wherein the flow control means further comprises a plug rotatably disposed in the valve body cavity.

7. The valve as defined in claim 1, wherein the valve body further comprises a stem passageway in communication with the body cavity and a stem seating surface surrounding the stem passageway and the stem passing through the stem passageway; and the stem further having a stem sealing surface disposed around said stem to sealing engage the stem seating surface surrounding the stem passageway in response to movement of the stem away from the flow control means whereby the valve operator means automatically provides a self adjusting and externally variable stem force for sealing the stem passageway from the valve body cavity.

8. The valve as defined in claim 1, wherein the stem moving means comprises a lift-and-turn means for causing only an axial movement of the stem during a limited interval of movement of the valve operator and for causing the stem to rotate during a time of movement of the valve operator other than the limited interval.

9. The valve of claim 1, wherein the body cavity is closed to arrest movement of the flow control means after axial force is unloaded from the flow control means during operation.

10. A valve comprising:

a valve body having a body cavity with a fluid flow passageway therethrough defining a fluid flow-path intersecting the body cavity;

a flow control means movably disposed in the body cavity for selectively closing and opening the fluid flow passageway;

a valve operator means connected to the flow control means and comprising:
  a single valve operator;
  a stem mounted for movement in reciprocal directions relative to, and independent of, the flow control means, said stem having a stem axis;
  a stem moving means associated with the single valve operator and the stem, said stem moving means for moving the stem in reciprocal directions with respect to the flow control means to cause the stem to move in a sequence of steps that provides axial motion away from the flow control means and then rotary motion in response to movement of the single valve operator, and then axial motion towards the flow control means in response to further movement of the single valve operator; and
  stop means disposed on the flow control means for arresting axial movement of the stem towards the flow control means and thereby transmitting a stem force to the flow control means, such that movement of the single valve operator causes the flow control means to be substantially unloaded of axial force from the stem and then the stem rotated, and further movement of the single valve operator causes the flow control means to be loaded with an axial force by the stem so as to provide a better sealing function in a selected valve position than when an axial force by the stem has not been applied to the flow control means.

11. The valve as defined in claim 10, wherein the flow control means further comprises a trunnion on the valve body rotatable about the stem axis and disposed on a side of the flow control means opposite the stem.

12. The valve as defined in claim 10, wherein the flow control means further comprises a hollow conduit therethrough alignable with the fluid flow passageway.

13. The valve as defined in claim 10, wherein the flow control means further comprises a plug rotatably disposed in the valve body cavity.

14. The valve as defined in claim 10 wherein the stem moving means comprises a lift-turn-and-reseat means for causing only an axial movement of the stem during a limited interval of movement of the valve operator and for causing the stem to rotate during a time of movement of the valve operator other than the limited interval.

15. The valve of claim 10, wherein the body cavity is closed to arrest movement of the flow control means after axial force is unloaded from the flow control means during operation.

* * * * *